United States Patent [19]

Powell et al.

[11] 3,892,269
[45] July 1, 1975

[54] PNEUMATIC TIRE
[75] Inventors: Leslie Vernon Powell, Lichfield;
   Reginald Harold Edwards,
   Coldfield, both of England
[73] Assignee: Dunlop Holdings Limited, England
[22] Filed: July 13, 1973
[21] Appl. No.: 378,825

Related U.S. Application Data
[63] Continuation of Ser. No. 150,561, June 7, 1971, abandoned.

[30]   Foreign Application Priority Data
   June 20, 1970   United Kingdom............... 30030/70

[52] U.S. Cl......... 152/330; 152/330 L; 152/330 RF; 152/354; 152/357; 152/374
[51] Int. Cl. .......................... B60c 9/02; B60c 17/00
[58] Field of Search .................... 152/330, 352–355, 152/357, 374

[56]   References Cited
   UNITED STATES PATENTS
| | | | |
|---|---|---|---|
| 3,253,635 | 5/1966 | Travers | 152/354 |
| 3,540,510 | 11/1970 | Smithkey, Jr. | 152/353 |
| 3,610,308 | 10/1971 | McDonald | 152/352 A |
| 3,610,310 | 10/1971 | Wittneben | 152/352 |

*Primary Examiner*—Drayton E. Hoffman
*Attorney, Agent, or Firm*—Stevens, Davis, Miller & Mosher

[57]   ABSTRACT

A pneumatic tire having in the outer region of each of the sidewalls an annular layer of soft rubber, said soft rubber having a hardness of 45 BSI or softer. The annular layer of soft rubber can be on the inside or the outside of the carcass.

7 Claims, 5 Drawing Figures

PNEUMATIC TIRE

This is a continuation, of application Ser. No. 150,561, filed June 7, 1971 now abandoned.

This invention relates to pneumatic tires.

When a pneumatic tire is punctured, loss of air can occur to the extent that opposite interior walls of the tire come into contact with high localized pressure and the tire adjacent to the contact patch is severely flexed and buckled. This creates very high stresses in the rubber and the reinforcing materials within the tire and can lead to tire failure, e.g. by fatigue, in particular since there are flexing movements in the tire of very great amplitude which are repeated during each rotation of the tire.

According to the present invention there is provided a pneumatic tire having in the outer region of each of the sidewalls an annular layer of soft rubber applied to the rubber of the sidewall said soft rubber having a hardness of 45 B.S.I. or softer.

If desired the modulus of elasticity of the rubber may also be low e.g. less than 450 lbs./square measured at 300 percent extension but rubbers of considerably higher modulus may also be used.

The sidewall of a tire is considered, in this specification, to be that portion of a tire which extends from the edge of the tread which forms the limit of the ground contacting surface to the position on the tire corresponding to the radially outer limit of the flange of a standard wheel rim to which the tire would normally be fitted.

The outer region of each of the tire sidewalls, adjacent to the tread, to which the annular layer of soft rubber is applied may extend from the edge of the tread which forms the limit of the ground contacting surface, radially inwardly to the mid-sidewall region i.e., that region of the tire of maximum width measured on the moulded tire, though the region may be smaller and lying between the above-mentioned limits.

The layer of soft rubber is preferably located substantially radially outwardly of a point lying radially outwardly of the mid-sidewall by an amount of about 1 of the total sectional height of the moulded tire measured from the bead base to the peak of the crown of the tire tread.

The maximum thickness of the annular layer of soft rubber may lie between 1 mm and the total thickness of rubber down to the topping compound on the cords of the tire casing.

The annular soft rubber layer may be located outwardly or inwardly of the carcass sidewall i.e., on the inner liner side but preferably, in either case the outer region of each of the sidewalls of the tire are devoid of discontinuities such as deep grooves or any other such pattern features which may load to concentration of stresses during severe flexing.

In a tire in accordance with the invention, the provision of the soft rubber layer serves to reduce the very high stresses in the rubber and the reinforcing material within the tire under deflated running conditions compared with tires having no such layer by the distribution of the strains in the structure. Thus early structural failure can be avoided and a deflated tire according to the invention may be driven an increased distance compared with a conventional tire not in accordance with the invention, without serious damage, a replacement tire and wheel assembly eventually being fitted.

This invention is applicable in particular to tires having carcasses of radial cords but can be applied to carcasses of cross-bias cords. Since the tire is designed to be run safely under deflated conditions the aspect ratio of the tire is preferably low, e.g. between 50 and 75 per cent and particularly between 55 and 70 per cent and the width of the tread of the tire is preferably greater than the width between flanges of the rim of the wheel for which the tire is designed.

The present invention may be used in conjunction with the inventions of our co-pending Patent applications 154,326 filed June 18, 1971 now U.S. Pat. No. 3,739,829 issued June 19, 1973; 150,558 filed June 7, 1971; 150,627 filed June 7, 1971; 150,562 filed June 7, 1971; and 150,628 filed June 7, 1971.

The invention applies to tire and wheel assemblies in which the tire can be removed from the rim e.g. where the rim is a split rim or, alternatively, when the tire is not removable therefrom, i.e. the two form a permanent assembly, for example, when the rim is swaged over the tire beads after assembly of the tire and rim.

Several examples of the invention will now be described by way of example only with reference to the accompanying drawings in which.

Figure 1:
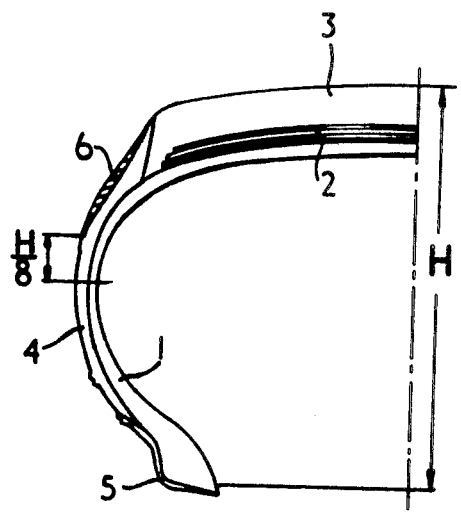
FIG. 1 shows in section a sidewall of a tire having thereon a veneer of soft rubber in the outer region.

As shown in FIG. 1, a 185/60-13 radial ply tire consists of a carcass 1, containing a textile radial cord reinforcing ply and bead assemblies, several breaker layers 2, tread rubber 3 and sidewall rubber 4, and a chafer strip 5.

The tread rubber 3 is of a usual type and has a hardness in the range 63 to 73 B.S.I. whereas the sidewall rubber is softer having a hardness in the range 53–57 B.S.I.

In the outer sidewall region of the tire is positioned a thin layer 6 of soft rubber having a hardness of 43 B.S.I. and a modulus at 300 percent extension of 800 lbs/in$^2$. The layer of soft rubber extends over a major portion of the outer region of the sidewall from a point positioned 1/8 of the radial sectional height (H) of the tire radially outwardly of the mid-sidewall to a point high on the tire shoulder and has a maximum thickness 1 mm.

Figure 2:
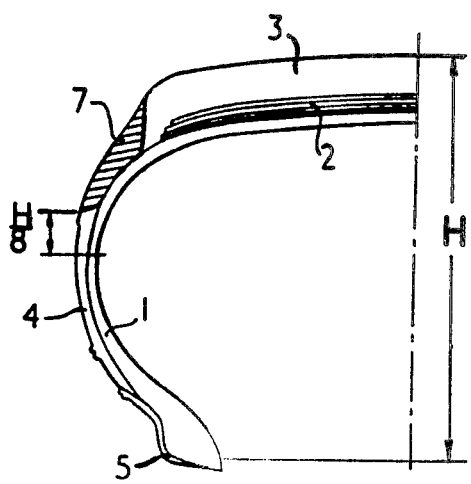
FIG. 2 shows in section a sidewall of a tire having a layer of thicker soft rubber in the outer region.

In the example shown in FIG. 2 the tire is of similar construction to that shown in FIG. 1 except that a layer 7 of the soft rubber replaces substantially all the sidewall rubber radially outwardly of a point positioned ⅛ of the section height (H) of the tire radially outwardly of the mid-sidewall.

In the example shown in FIG. 3 the tire is again of similar construction to that shown in FIG. 1 except that a layer 8 of the soft rubber having a maximum thickness of 1 mm. is located radially inwardly of the carcass plies. The layer 8 extends radially outwardly to beneath the tread edge from between the mid-sidewall and a point positioned ⅛ of the section height of the tire radially outwardly of the mid-sidewall.

Figure 3:
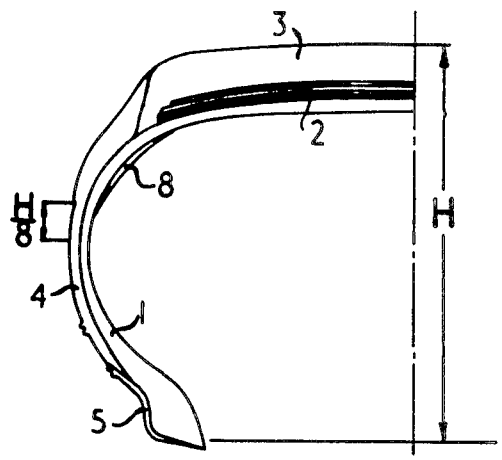
FIG. 3 shows in section a sidewall of a tire having thereon a thin layer of soft rubber inside the carcass in the outer sidewall region.
Figure 4:
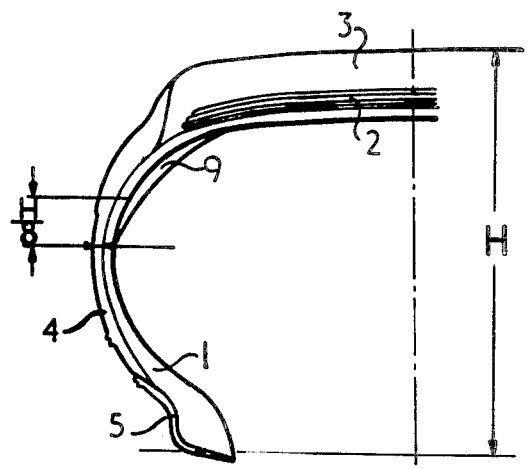
FIG. 4 shows in section a sidewall of a tire having a thicker layer of soft rubber inside the carcass in the outer sidewall region.

In the example shown in FIG. 4 the tire is similar to that shown in FIG. 3 except that a thicker layer 9 of the soft rubber is provided radially inwardly of the carcass plies. The layer 9 has a maximum thickness equal to the thickness of sidewall rubber 4 at the mid-sidewall and extends from the mid-sidewall to a region radially inwardly of the tread edge.

An example of a soft rubber suitable for use in the invention is given in the table below, all amounts of ingredients being given in parts by weight

TABLE

| Natural rubber | 50 | Insoluable sulphur | 2 |
| Neoprene WRT | 50 | MBTS | 0.7 |
| Lampblack | 20 | Nonox ZA | 1.25 |
| HAF black | 10 | BLE 25 | 1.75 |
| Light Cal.Mag. | 2 | | |
| Pine Tar | 3 | | |
| Coumarone Indene resin | 3 | Hardness 40 to 43 B.S.I. | |
| Zinc Oxide | 4 | | |

The soft rubber used in the tires of this invention is preferably a rubber having a high resistance to flex cracking, particularly at temperatures of the order of 100°C. to 140°C.

Figure 5:
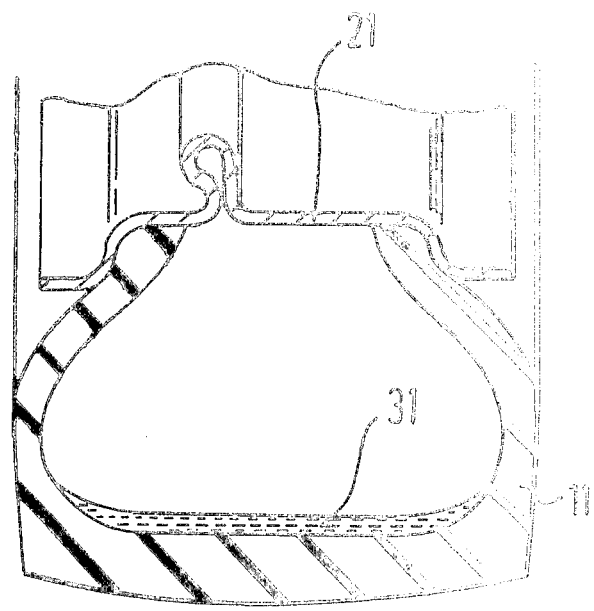
FIG. 5 shows in section a lubricated tire and rim assembly.

FIG. 5 shows a tire 11 having an inner layer 31 of lubricating material and mounted upon a wheel rim 21 which has been axially compressed so that there is no well into which the tire beads can fall and become dislodged. The outer regions of sidewalls of this tire would be furnished with the annular layer of soft rubber as previously discussed and disclosed in detail in FIGS. 1–4.

Having now described our invention, what we claim is:

1. A pneumatic tire and wheel assembly capable of being run in a deflated condition having a single inflation chamber comprising:
   a. a wheel having a wheel rim with a pair of annular flanges;
   b. a pneumatic tire comprising sidewall portions and a tread portion whose width is greater than the width of the wheel rim measured between the flanges;
   c. means to prevent the tire from becoming dislodged from the wheel when running deflated;
   d. a lubricant which, when the assembly is used with the tire in a deflated condition, will facilitate relative movement of contacting interior surfaces of the tire; and
   e. means to facilitate folding between said sidewall portions and tread portion, said means comprising an annular layer of soft rubber having a thickness of at least 1 mm extending over a major proportion of the outer region of each of the sidewall portions, said soft rubber having a hardness of 45 B.S.I. or softer, the outer region of each sidewall being free of discontinuities of thickness which lead to concentration of stresses during severe flexing.

2. A pneumatic tire and wheel assembly according to claim 1 in which the layer of soft rubber is located substantially radially outwardly of a point lying radially outwardly of mid-sidewall by the amount of about ⅛ of the total sectional height of the moulded tire measured from the bead base to the peak of the crown of the tire tread.

3. A pneumatic tire and wheel assembly according to claim 1 in which the annular layer of applied rubber is located outwardly of the carcass sidewall.

4. A pneumatic tire and wheel assembly according to claim 1 in which the annular layer of soft rubber is located on the inner liner side of the carcass sidewall.

5. A pneumatic tire and wheel assembly according to claim 1 having an aspect ration between 30 percent and 75 percent.

6. A pneumatic tire and wheel assembly according to claim 5 in which the aspect ratio is between 55 percent and 70 percent.

7. A pneumatic tire and wheel assembly according to claim 1 in which the soft rubber has a high resistance to flow cracking at temperatures in the range 100°C to 140°C.

* * * * *